July 10, 1962  E. DURBIN  3,044,064
HYPERBOLIC NAVIGATION RECEIVER
Filed Aug. 20, 1956  2 Sheets-Sheet 1
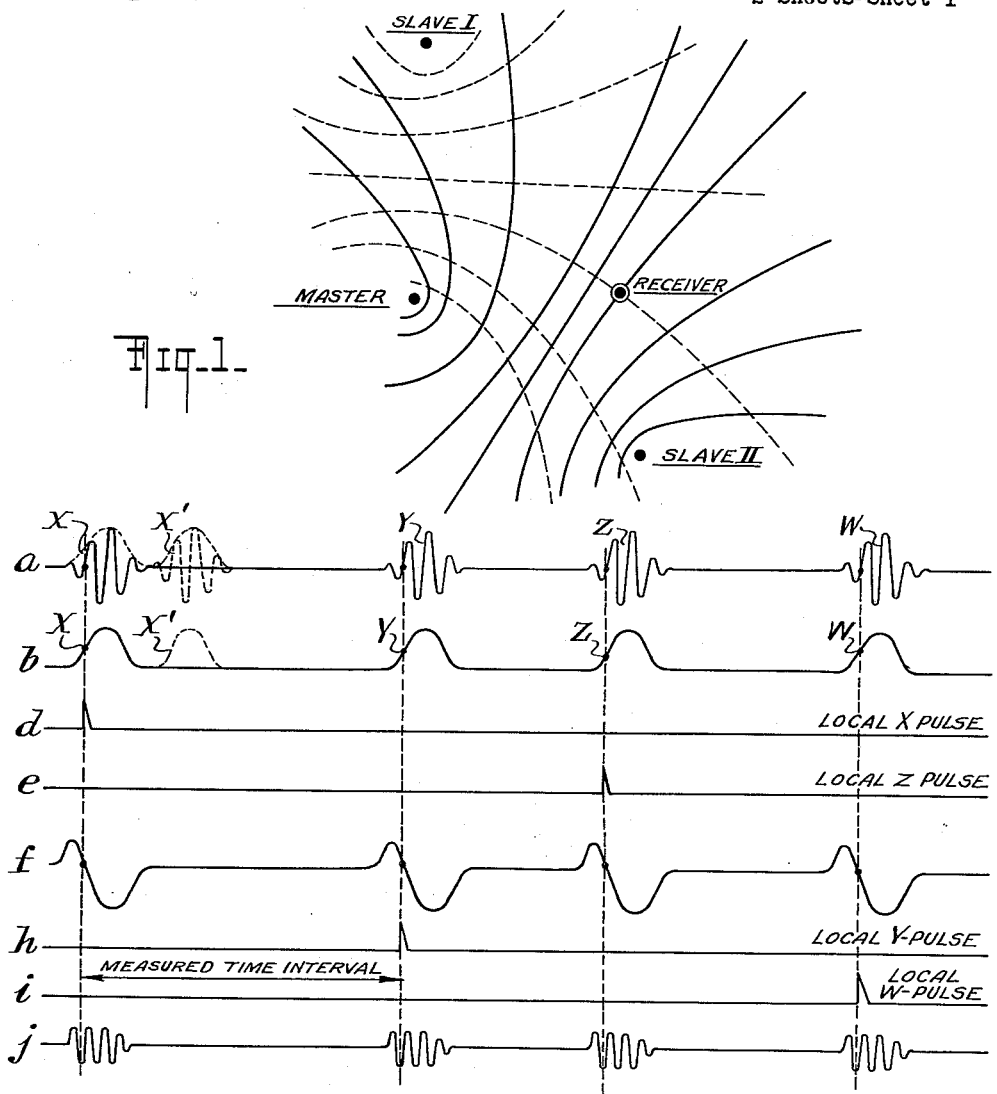
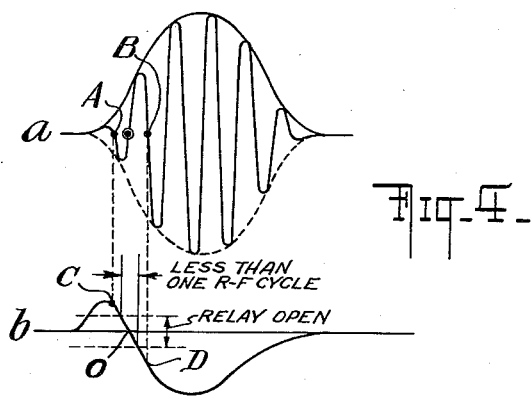
INVENTOR
EDWARD DURBIN
BY
ATTORNEY July 10, 1962
E. DURBIN
3,044,064
HYPERBOLIC NAVIGATION RECEIVER
Filed Aug. 20, 1956
2 Sheets-Sheet 2
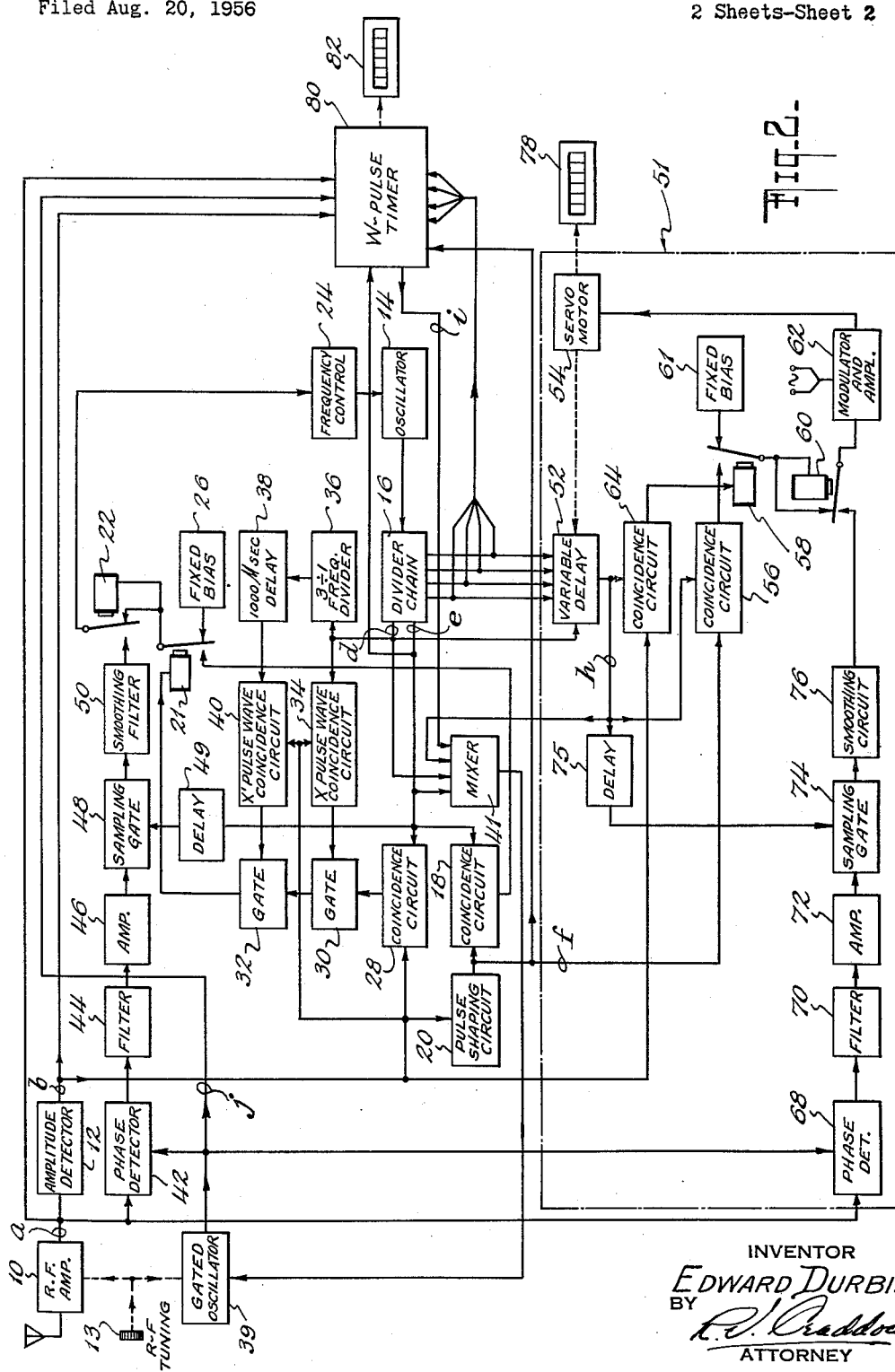
INVENTOR
*Edward Durbin*
BY
ATTORNEY United States Patent Office 3,044,064
Patented July 10, 1962

3,044,064
HYPERBOLIC NAVIGATION RECEIVER
Edward Durbin, Valley Stream, N.Y., assignor to Sperry Rand Corporation, a corporation of Delaware
Filed Aug. 20, 1956, Ser. No. 605,689
10 Claims. (Cl. 343—103)

This invention relates to radio receivers for hyperbolic navigation systems, and more particularly, is concerned with receiving apparatus for automatically and accurately indicating the time difference between radio frequency pulses produced by the master and slave stations in a loran type navigation system.

Radio navigational systems for determining a hyperbolic line of position are well known in the art. In these systems, such as loran, this line of position is determined by measuring at the receiving station the difference in travel time of two pulsed radio signals which are transmitted from two known widely spaced locations. Knowing the velocity of radio waves, the difference in travel time can be converted to a difference in distance from the two known locations. The difference in distance determines the hyperbolic line of position.

In copending application Serial No. 574,475, filed March 28, 1956, and now Patent No. 2,873,445, issued February 10, 1959, in the name of Winslow Palmer there is described an automatic loran receiver which indicates continuously the time relation in microseconds between the received master and slave pulses. The receiver therein described utilizes both pulse matching of the received master and slave pulses as well as cycle matching of the carrier signal of the received master and slave pulses to achieve a time measurement having a high degree of accuracy. In the cycle matching technique, time measurements are made, not between points on the envelope of the pulses but between corresponding points on the R.-F. cycles of the radio frequency carrier. The time of a point on the R.-F. cycle, such as a zero-crossing point, can be determined with much greater precision than a point on the pulse envelope. Cycle matching is achieved by utilizing a local oscillator having the same frequency as the carrier of the loran signals, phase matching the output of the oscillator with the master pulse and then phase shifting the output of the oscillator to match it in phase with the carrier of the slave pulse, the amount of phase shift being an indication of the time difference between the received master and slave stations to a fraction of a cycle at the carrier frequency.

It will be evident that in order to calibrate the phase shifter in terms of fixed time units, i.e., in microseconds, in making a time difference measurement by matching R.-F. cycles in the manner described above and taught in the above-identified copending application, the oscillator frequency must be a fixed predetermined value so that one cycle of phase shift represents a predetermined number of microseconds time difference. A receiver using this technique of cycle matching is therefore not particularly suitable for use on a number of different carrier frequencies.

It is, therefore, the general object of this invention to provide an improved automatic receiver using cycle matching to obtain time measurements.

It is another object of this invention to provide means for using cycle matching in an automatic loran receiver which can be tuned to a number of different carrier frequencies.

Another object of this invention is to provide means for tuning an automatic loran receiver to a number of carrier frequencies without affecting the calibration of the time measurement indicator.

These and other objects of the invention which will become apparent as the description proceeds are achieved in an automatic loran receiver of the type described in the above-mentioned copending application by using a gated oscillator, whose phase of oscillations bears a fixed time relation to the gating pulse, as the reference signal source in making a phase measurement of the received master and slave pulse carrier signals. The gated oscillator is tuned to the frequency of the carrier of the received signals. Automatic pulse matching between the received pulse envelopes and locally generated triggers is achieved by known means, the local triggers being used to gate on the oscillator. Separate control signals are derived representing the phase mismatch between the gated reference signal and the carrier of the received master and slave signals and are utilized, respectively, in corresponding master and slave servo means to adjust the time relation of the locally generated triggers to obtain phase coherence. The slave servo means drives a counter which reads directly in microseconds the time difference between the master and slave signals when the sequential outputs of the gated oscillator are made phase coherent with the carriers of the received master and slave signals.

For a better understanding of the invention, reference should be had to the accompanying drawings, wherein:

FIG. 1 is a diagram illustrating the principles of loran navigation;

FIG. 2 is a block diagram of the preferred embodiment of the present invention;

FIG. 3 shows the waveforms of and time relationship among various signals generated by the apparatus disclosed in FIG. 2; and FIG. 4 is a series of graphical plots used for explaining the pulse matching and cycle matching operation of the apparatus of FIG. 2.

According to the present disclosure, receiving apparatus is provided for automatically measuring the time intervals between the pulses produced by a low frequency triad loran transmitting system in which the phase of the radio frequency cycles produced by the master and slave stations are synchronized with each other. Moreover, the transmitters provide a fixed predetermined phase relationship between the R.-F. cycles and the pulse envelopes.

There are three transmitters forming the loran triad, a master station and first and second slave stations positioned so that the transmission pattern of each station covers the region which the system serves, as shown in the diagram of FIG. 1. The master station is arranged to transmit pulses of R.-F. energy at fixed time intervals and at a fixed repetition rate. One of the slave stations radiates a pulse at a fixed time after one pulse from the master station, and the other slave station radiates a pulse at a fixed time after the next pulse from the master station. Pulses as received at the receiving station are shown in FIG. 3a, in which the two master station pulses are designated X and Z, respectively, with the pulse from the first slave station being designated Y and the pulse from the second slave station being designated W. In order to identify the X pulses from the master station to establish a repetition interval time reference, an X' pulse is provided which is merely the X pulse delayed a brief interval of time, such as 1,000 microseconds, every third recurrence of the repetition interval. It should be noted, however, that other pulse identifying patterns or means may be used with corresponding modification of equipment, without departing from scope of the invention.

For use with the receiving apparatus disclosed herein, by way of example, the radio frequency cycles comprising the pulses emitted by each slave station must have a fixed predetermined phase relation to the radio frequency cycles comprising the pulses emitted by the master station. Also the radio frequency cycles comprising the pulses emitted by the slave stations and the master station must have a fixed predetermined phase relationship to the respective envelopes thereof. This is the case with loran navigation systems of the fixed relative phase type as taught in the aforementioned application Serial No. 574,475, now Patent Number 2,873,445. It should be noted, however, that the gated oscillator phase alignment technique employed in the present invention is also applicable to loran navigation systems of the free relative phase type, as disclosed in copending application Serial No. 577,187, filed April 6, 1956, and now Patent Number 2,811,718, issued October 29, 1957, in the name of Robert L. Frank, wherein said fixed predetermined phase relationship is not required.

The receiving station receives the respective pulses at times dependent upon the distance between the receiving station and the respective transmitters as well as the time relationship between the master and slave pulses. Each hyperbolic curve indicated by a solid line in FIG. 1 shows the locus of receiving points for which the time delay between the master pulses Z and the slave pulses W has a certain constant value. Each hyperbolic curve indicated by a dashed line shows the locus of receiving points for which the time delay between the master pulses X and slave pulses Y has a certain constant value. Thus the time delay between the Z and W pulses and between the X and Y pulses at a receiving station located within the radiation pattern of the three transmitters serves to determine two hyperbolic curves on which the receiving station is located. The intersection of the two hyperbolic curves as plotted on a suitable loran chart determines the point at which the receiving station is situated.

The time relationship between the master and slave pulses is such that the X pulses are received prior to the corresponding Y pulses and the Z pulses are received prior to the corresponding W pulses at any receiving point within the region which the system serves. Furthermore the time relationship is such that at any receiving point within the region which this system serves, the Y pulses are received only during the interval of time between the X and Z pulses and the W pulses are received only during the interval of time between the Z and X pulses. Thus the sequence of the signals which occur at the receiving point during each recurrence period is X, Y, Z and W as indicated in FIG. 3a.

Referring to FIG. 2, the numeral 10 indicates generally a radio frequency amplifier for receiving and amplifying the incoming master and slave signals. The amplifier is tuned to the carrier frequency of the selected loran triad by suitable tuning means controlled by a manual control 13. The output of R.-F. amplifier 10, having the waveform as shown in FIG. 3a, is coupled to an amplitude detector 12 from which the pulse envelopes of the received signals are derived, as shown in FIG. 3b.

The receiver further includes a local oscillator 14, which is preferably crystal controlled to provide a highly stable oscillator. The output of the oscillator is coupled to a divider chain 16 that includes an output bistable multivibrator. Two trigger pulse trains are derived from the divider chain in which the trigger pulses occur at substantially the repetition rate of the X pulses from the master station. The pulses in the two trigger pulse trains are displaced a half repetition period from each other, so that by proper phasing with relation to the incoming pulses as derived from the amplitude detector 12, the pulses of one trigger pulse train can be made coincident with the received X pulses and the pulses of the other pulse train can be made coincident with the Z pulses. The waveforms of the trigger pulse trains derived from the divider circuit 16 are shown in FIGS. 3d and 3e.

In order to synchronize the trigger pulses from the divider chain 16 with the received X and Z pulses, one of the trigger outputs, such as the triggers at the output e of the divider chain 16 is coupled to a coincidence circuit 18. The coincidence circuit is also coupled to the output of the amplitude detector 12 by means of a pulse shaping circuit 20, which preferably is a circuit arranged to take the derivative of the received pulse envelope from the amplitude detector 12 and combine it with the inverse of the received pulse envelope to produce an output pulse having a waveform shown in FIG. 3f and also in FIG. 4b. A suitable pulse shaping or derivative circuit is shown in the disclosure of U.S. Patent application Serial No. 471,170 filed November 26, 1954, and now Patent 2,946,019 granted July 19, 1960, in the name of Robert L. Frank.

The coincidence circuit 18 is arranged to produce a D.-C. output voltage that varies in magnitude depending on the degree of coincidence between the ouput of the pulse shaping circuit 20 and the triggers derived from the divider chain 16. A suitable coincidence circuit is described in Patent No. 2,636,988. The output of the coincidence circuit 18 is a function of the time relation between the output of the pulse shaping circuit 20 and the trigger from the divider chain 16, and has the same form when plotted as the curve of FIG. 4b. Thus the output of the coincidence circuit 18 goes to zero when the trigger pulses from the divider chain 16 are coincident with the crossover point O of the output pulses from the pulse shaping circuit 20 as shown in FIG. 4b and varies substantially linearly between the points C and D on either side of the crossover point O as the time relationship between the triggers and the derived pulses varies.

The output of the coincidence circuit 18 is coupled through a pair of switching relays 21 and 22 in series, when the relays are energized (in a manner hereinafter to be more fully described), to an automatic frequency control circuit 24 associated with the oscillator 14. The frequency control circuit 24 may be a conventional reactance tube circuit used in well known automatic frequency control systems by means of which the frequency of the oscillator 14 is shifted in response to the D.-C. output of the coincidence circuit 18 so as to bring the triggers at the output of the divider chain 16 into coincidence with the crossover point of the derived pulse from the pulse shaping circuit 20.

Before the coincidence circuit 18 can be used to control the oscillator 14, it is necessary that the trigger pulses at the output e of the divider chain 16 be brought into substantial coincidence with the crossover point of the derived envelope pulse from the pulse shaping circuit 20. Furthermore, it is necessary that the trigger from the divider chain 16 be brought into substantial coincidence with the Z pulse and be prevented from locking into coincidence with the received X, Y, or W pulses.

For this reason the relay 21 is provided which normally connects a fixed bias source 26 to the second relay 22. The fixed bias is of sufficient magnitude to close the relay 22 thereby connecting the output of the fixed bias to the frequency control circuit 24. The effect of the fixed bias is to reduce the frequency of the oscillator 14 whereby the pulse repetition rate of the triggers at the output of the divider chain 16 is made slower than the repetition rate of the incoming pulses. The relay 21 is energized only when the triggers from the divider chain 16 are brought into substantial coincidence with the proper received pulse. The time constant of the relay 22 is such that it does not open when the current through the relay 22 is momentarily interrupted by the switching of relay 21 from fixed bias control to control by the coincidence circuit 18.

The relay 21 is energized in response to the output of a coincidence circuit 28 to which is coupled the trigger pulse from output e of the divider chain 16 and also the envelope pulse output from the amplitude detector 12. The output of the coincidence circuit 28, which is similar to the coincidence circuit 18, is coupled through a pair of gate circuits 30 and 32 to the relay 21 when substantial coincidence occurs between the trigger and the envelope pulses. If the gates 30 and 32 are open, the relay 21 will be energized.

In order to insure that the coincidence circuit 28 synchronizes with the Z pulses without ambiguity, use is made of the X' pulse, which, as described above, occurs every third cycle when the X pulse is delayed at the transmitter a thousand microseconds. Triggers from the output d of the divider chain 16 are coupled to an X pulse coincidence circuit 34, which controls the gate 30, and through a 3:1 divider circuit 36 and a thousand microsecond delay circuit 38 to a coincidence circuit 40 which controls the gate 32. The coincidence circuits 34 and 40 are also coupled to the output of the amplitude detector 12. Only when the triggers from the output d of the divider chain 16 are in coincidence with the X pulses will both the gates 30 and 32 be opened. Thus the relay 21 can only be energized when the triggers from the output e of the divider chain 16 are in substantial coincidence with the received Z pulses.

In order to effect more accurate time measurement by cycle matching in the automatic receiver system of the present invention, a gated oscillator 39 is provided which is triggered by the locally generated triggers from the divider 16 through a mixing circuit 41. The gated oscillator 39 may be of a type described in vol. 20, Radiation Laboratory Series, McGraw-Hill Publishing Company, pages 108 and 109. The oscillator 39 when triggered generates a group of cycles at the carrier frequency, the oscillator being tuned by the control knob 13 simultaneously with the R.-F. amplifier 10. The phase of the gated oscillator is fixed in relation to thee triggers, so that varying the time of the triggers varies the phase of the oscillator output relative to the received carrier signals.

A second servo loop for controlling the oscillator 14 and therefore the phase of the gated oscillator output includes a phase detector 42 coupled to the output of the oscillator 39 and to the output of the R.-F. amplifier 10. The output of the phase detector 42 is proportional to the cosine of the phase angle between the two input signals and goes to zero only when the carrier is 90° out of phase with the gated oscillator signal.

The output of the phase detector 42 is filtered by the filter circuit 44 to remove the R.-F. components and is coupled through an amplifier 46 to a sampling gate 48. The sampling gate 48 is triggered open by the trigger pulses from the output e of the divider chain 16 so that the output of the phase detector is sampled only during the leading edge of the received Z pulses. A suitable sampling gate circuit is described in more detail in the copending application Serial No. 91,659, filed May 6, 1949, and now Patent Number 2,811,716, granted October 29, 1957, in the name of Philip W. Crist. The gating trigger is delayed by means of a delay circuit 49 to permit the gated reference oscillator 39 to start a few cycles before the actual phase comparison is made.

The output from the sampling gate 48 is coupled to a smoothing circuit 50 which may be a low-pass filter, or integrating circuit having a long time constant, whereby the output of the smoothing circuit 50 is proportional to the D.-C. component of the output of the sampling gate 48. The output of the smoothing circuit 50 is connected by the relay 22 to the frequency control circuit 24 whereby, when the relay 22 is open, the oscillator 14 is adjusted in frequency to trigger the oscillator 39 at a time such that the output of the oscillator 39 is brought into phase coherence with the carrier of the Z pulse.

From the description thus far it will be seen that two servo loops are provided, one involving the coincidence circuit 18 for achieving a pulse match between the output of the divider chain and the incoming pulse envelopes, and a second servo loop including a phase detector 42 for providing phase coherence between the output of the gated oscillator 39 and the R.-F. carrier of the master pulses.

The two servo loops include as common elements the same frequency control, local C.W. source and pulse generating source in the form of frequency control 24, oscillator 14 and divider chain 16. Thus, no independent adjustment of the pulse match by the first servo loop and the phase match by the second servo loop can be made. Therefore, the phase relation between the received carrier and pulse envelope must be a fixed predetermined amount so that there can be achieved the simultaneous occurrences of coincidence between the locally generated trigger and the received pulse envelopes and phase coherence between the cycles of the gated oscillator and those of the received carrier. In this way the second servo loop acts as a fine adjustment on the coincidence of the received pulses and the locally generated triggers, after the action of the first servo loop has brought the pulses and triggers into substantial coincidence.

In operation, the fixed bias 26 causes the oscillator 14 frequency to be low so that the local triggers shift in phase with respect to the received pulses until substantial coincidence between the locally generated trigger pulses and the received master pulses occurs. The first servo loop is then brought into operation by the relay 21 to adjust the oscillator 14 so as to maintain coincidence between the locally generated triggers and the received master pulses. By operation of the relay 22, when alignment between the triggers and the received pulses is achieved, extremely accurate control of the oscillator 14 is achieved by the cycle matching servo to maintain phase coherence between the gated oscillator 39 and the received master carrier signal.

In order to make a time measurement between the X and Y pulses, a Y pulse timer circuit, indicated generally at 51, is provided having a second similar pair of servo loops to control locally generated triggers in coincidence with the Y pulses and to control the gated oscillator 39 so that the output is made phase coherent with the carrier of the Y pulses. The locally generated pulses coincident with the received Y pulses, are produced by means of a variable delay circuit 52 coupled to the trigger pulse output of the divider chain 16, which is preferably of the type described in Patent No. 2,621,238. The variable delay 52 utilizes a plurality of harmonically related signals derived from the divider chain 16 to produce output pulses that are accurately controlled in time in response to a shaft rotation. A servomotor 54 actuates the input shaft of the variable delay circuit 52 to produce the desired delay in the output of the delay circuit 52. The output of the delay circuit 52 is shown in FIG. 3h.

The delayed output triggers from the variable delay circuit 52 are coupled to a coincidence circuit 56 which is similar to the above-described coincidence circuit 18. The coincidence circuit 56 is also coupled to the output of the pulse shaping circuit 20. The coincidence circuit produces a D.-C. error signal indicative of the displacement between the delayed trigger and the crossover point of the derived Y pulse from the pulse shaping circuit 20. This error signal from the coincidence circuit is connected through a relay 58 and relay 60 to a modulator and amplifier circuit 62 by means of which it controls the A.-C. servomotor 54. The relay 58 is arranged so that it normally connects a fixed bias 61 to the relay 60, energizing the relay 60 to connect the fixed bias to the input of the modulator and amplifier circuit 62. The relay 58 in turn is controlled by the output of a coincidence circuit 64 which is coupled to the delayed trigger pulse from the variable delay circuit 52 and to the output of the amplitude detector 12. When substantial coincidence occurs between the Y pulses and the triggers from the delay circuit 52, the coincidence circuit 64 closes the relay 58 thereby interrupting the fixed bias and providing control of the servomotor 54 by the output of the coincidence circuit 56. The servomotor 54 is controlled by the coincidence circuit 56 to make the output triggers from the delay circuit 52 coincident with the crossover point of the derived Y pulses from the derivative circuit 20.

In order to provide an accurate time measurement involving cycle matching, when the coincidence circuit 56 produces substantial match between the local triggers and the received Y pulses, the output of the coincidence circuit 56 is reduced substantially to zero permitting the relay 60 to drop out and connect a cycle matching servo loop to the servomotor 54 as hereinafter described.

The cycle matching loop includes the gated oscillator 39 coupled to the output of the variable delay 52 through the mixer 41. The output of the gated oscillator 39, shown in FIG. 3j, is coupled to a balanced phase detector 68 where it is compared with the phase of the carrier of the received pulses from the R.-F. amplifier 10. The output of the phase detector 68 is a voltage pulse wave whose amplitude is proportional to the cosine of the phase angle between the two waves which are compared. This output voltage is applied to a filter 70 for removing the I.-F. components of the phase detector output. The filtered signal is coupled through an amplifier 72 to a sampling gate 74, similar to the sampling gate 48, but triggered by the output of the variable delay circuit 52 through a fixed delay 75. Thus the output of the phase detector is sampled during the received Y pulses. The output of the sampling gate is applied to a smoothing circuit 76 similar to the smoothing circuit 50 described above by which a signal proportional to the D.-C. component of the sampling gate output signal is derived. The output of the smoothing circuit 76 is connected by the relay 60 through the modulator and amplifier 62 to the servomotor 54 which adjusts the gated oscillator 39 to reduce the output of the phase detector 68 to zero.

Referring to FIG. 4, FIG. 4a shows a received pulse, for example, a Y pulse from the slave station with its R.-F. cycle content. FIG. 4b shows the output of the derivative circuit 20 resulting from the Y pulse of FIG. 4a. FIG. 4b also represents the change in voltage at the output of the coincidence circuit 56 as a function of the time relationship between the output of the derivative circuit 20 and the delayed trigger from the delay circuit 52. It will be seen that if the relay 60 is caused to open when the output from the coincidence circuit 56 is reduced to the region indicated by the horizontal dotted lines in FIG. 4b, the gated oscillator 39 will be adjusted in phase to within one cycle of the desired crossover point of the R.-F. signal at O in FIG. 4a.

By providing a suitable counter, such as indicated at 78, coupled to the output of the servomotor 54, an accurate time measurement between the X and Y pulses as measured between a particular cycle crossover point in the carrier of the X pulse and corresponding crossover point in the carrier signal of the Y pulse is provided. Since, when the relay 60 drops out, the output of the gated oscillator 39 must be adjusted within plus or minus a half cycle of the desired R.-F. carrier crossover point, it is necessary that the phase relationship between the R.-F. carrier and the Y pulse envelope be fixed within an error of less than plus or minus half an R.-F. cycle. Otherwise when the relay 60 opened, the cycle matching servo loop including the phase detector might adjust the gated oscillator output a cycle before or a cycle after the desired R.-F. cycle crossover point and the reading of the counter 78 would be off by the period of one cycle.

A similar time measurement for the W pulse is made by a W pulse timer circuit indicated generally at 80 which controls a suitable counter 82 on which the time interval between the Z and W pulses is indicated. The W pulse timer is identical to the Y pulse timer circuit 51 except that the input trigger to the variable delay in the W pulse timer 80 is derived from the e output of the divider chain 16 instead of the d output, whereby the W pulse timer measures the interval from the Z pulse, rather than from the X pulse as in the Y pulse timer 51.

The time indications on the counters 78 and 82 identify the lines of position on a loran chart. The point of intersection between these two lines of position then provides a fix corresponding to the position of the receiving station, as described in connection with FIG. 1. The ultimate accuracy of the indications of the counters 78 and 82 is improved by comparing the phase of corresponding zero crossover points of the R.-F. cycles of the respective pulses. Cyclic ambiguity is resolved by adjusting the time difference to within plus or minus half a cycle by measuring the time difference between the pulse envelopes first and then switching over to the cycle matching only when the time difference has been brought within this error.

From the above description it will be seen that the various objects of the invention have been achieved by the provision of a completely automatic loran type receiver. By using a gated oscillator as a reference source in the cycle matching phase of operation, instead of a phase shifted C.W. source as heretofore proposed, the output counters can always be read directly in units of microseconds irrespective of the frequency to which the receiver is tuned. By tuning the gated oscillator to the selected carrier frequency a phase comparison can be made without affecting the reading, since the counter respond only to time intervals between triggers to the gated oscillator.

The receiver system described is a preferred embodiment utilizing the invention of gating a local oscillator to derive a cycle matching reference signal. However, the system may be modified in many ways without departing from the scope of the present invention. For example, the automatic frequency control on the oscillator 14 may be controlled in response to the average of the error signals derived from the master and slave pulse coincidence circuits 18 and 56, as taught in copending application Serial No. 453,711, filed September 1, 1954, and now Patent 2,768,373, granted October 23, 1956, in the name of Edward Durbin. Also, since the master and slave pulses occur in time sequence, time sharing of many of the circuits may be employed. For example, the coincidence circuits 18 and 56 can be time shared, and the coincidence circuits 28 and 64, so that a single coincidence circuit could be used in each case. Additionally, a single phase detector, filter, amplifier, and sampling gate can be time shared rather than using separate phase detectors 42 and 68, filters 44 and 70, amplifiers 46 and 72, and sampling gates 48 and 74.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An automatic loran receiver for indicating the time relation between master and slave pulses received in groups at a predetermined repetition rate, said receiver comprising means for generating local recurrent pulse groups including means for varying the repetition rate of said groups and means for varying the time interval between pulses within the groups, means for deriving pulses in response to the received master and slave pulses, pulse coincidence means responsive to the locally generated pulse groups and the derived pulse groups for producing first and second error signals indicative respectively of the difference in the repetition rate of the locally generated pulse groups and the received pulse groups and of the difference in the time interval between corresponding pulses within the received and locally generated pulse groups, a gated oscillator tuned to the frequency of the carrier of the received master and slave pulses, the oscillator being gated on momentarily in response to each of the locally generated pulses for generating groups of pulsed radio frequency signals, phase comparator means responsive to the carrier of the received pulses and the pulsed radio frequency signals from the gated oscillator for producing third and fourth error signals indicative respectively of the difference in the phase between the gated oscillator output signals and the carrier of the received signals and of the difference in the respective phase shifts between corresponding pulsed signals within the received and locally generated groups of pulsed radio frequency signals, means for selectively coupling said first and third error signals to said means for varying the repetition rate of the local recurrent pulse groups, and means for selectively coupling said second and fourth error signals to said means for varying the time interval between pulses in a group.

2. Apparatus as defined in claim 1 wherein said means for generating local recurrent pulse groups comprises a local oscillator, a divider, variable time delay means coupled to the divider, and means for mixing the pulses derived from the divider and from the variable delay means.

3. Apparatus as defined in claim 1 wherein said pulse coincidence means includes a first coincidence circuit coupled to the divider output and the output of received pulse deriving means, the first coincidence circuit producing said first error signal, and a second coincidence circuit coupled to the output of the variable delay means and the output of the received pulse deriving means, the second coincidence circuit producing said second error signal.

4. Apparatus as defined in claim 1 wherein said phase comparator means includes phase detecting means having a first input coupled to the output of the gated oscillator and a second input to which is applied the received signal, first and second sampling gates coupled to the output of the phase detecting means, the first sampling gate being triggered in response to the output of the divider and the second sampling gate being triggered in response to the output of the variable delay means, and low-pass filter means coupled to the output of the respective sampling gates for producing said third and fourth error signals in response to the sampling gate outputs.

5. An automatic loran receiver for indicating the time relation between master and slave pulses received in groups at a predetermined repetition rate, said receiver comprising means for generating local recurrent pulse groups including means for varying the repetition rate of said groups and means for varying the time interval between pulses within the groups, a gated oscillator tuned to the frequency of the carrier of the received master and slave pulses, the oscillator being gated on momentarily in response to each of the locally generated pulses for generating groups of pulsed radio frequency signals, phase comparator means responsive to the carrier of the received pulses and the pulsed radio frequency signals from the gated oscillator for producing first and second error signals indicative respectively of the difference in the phase of the oscillator output signals and that of the carrier of the received signals and of the difference in the respective phase shifts between corresponding pulsed signals within the received and locally generated groups of pulsed radio frequency signals, means for coupling said first error signal to said means for varying the repetition rate of the local recurrent pulse groups, and means for coupling said second error signal to said means for varying the time interval between pulses in a group.

6. An automatic loran receiver for indicating the time relation between master and slave pulses received in groups at a predetermined repetition rate, said receiver comprising means for generating local recurrent pulse groups including means for varying the repetition rate of said groups and means for varying the time interval between pulses within the groups, oscillator means tuned to the frequency of the carrier of the received master and slave pulses, means for triggering on the oscillator means momentarily in response to each of the locally generated pulses for generating groups of pulsed radio frequency signals, phase comparator means responsive to the carrier of the received pulses and the pulsed radio frequency signals from the oscillator means for producing first and second error signals indicative respectively of the difference in the phase of the oscillator output signals and the carrier of the received signals and of the difference in the respective phase shifts between corresponding pulsed signals within the received and locally generated groups of pulsed radio frequency signals, means for coupling said first error signal to said means for varying the repetition rate of the local recurrent pulse groups, and means for coupling said second error signal to said means for varying the time interval between pulses in a group.

7. Apparatus for synchronizing a locally generated pulse with a received pulsed carrier signal comprising a local pulse generator, means for controlling the time of occurrence of the output pulses of said generator in response to an error signal, means for generating a first error signal in response to the time relation between the pulse envelopes of the received signal and the output pulses from said generating means, a gated oscillator having an output frequency substantially the same as the carrier of the received signal, means for gating the oscillator on momentarily in response to each of the pulses from said generator, means for generating a second error signal in response to the phase relation between the carrier of the received signal and the output of said gated oscillator, and means for selectively coupling said first and second error signals to said means for controlling the pulse generator, said means for selectively coupling being actuated in response to the first error signal, whereby the pulse generator is controlled by the second error signal when the first error signal is reduced substantially to zero.

8. In combination, a source of first and second recurrent high frequency signals of substantially the same carrier frequency, said signals comprising first and second pulses occurring at a predetermined repetition rate, the second pulses having a variable time and phase relation to said first pulses, a gated oscillator having the same frequency as the carrier of said signals, means for generating triggers in substantial synchronism with said first and second pulses, the triggers being coupled to the gated oscillator for triggering on said gated oscillator momentarily, the phase of the gated oscillator being synchronized with the triggers, and servo means responsive to the relative phase of said signals and the output of the gated oscillator for controlling the timing of the triggers, whereby the triggers are accurately synchronized with said first and second pulses.

9. In combination, a source of first and second recurrent high frequency signals of substantially the same carrier frequency, said signals comprising first and second pulses occurring at a predetermined repetition rate, the second pulses having a variable time and phase relation to said first pulses, means for generating triggers in substantial synchronism with said first and second pulses, means responsive to said triggers for generating local pulses of high frequency energy at the carrier frequency of said signals, the phase of each of the local high frequency energy pulses being fixed in relation to the initiating trigger, and servo means responsive to the relative phase of said signals and said local pulses of high frequency energy for controlling the timing of the triggers, whereby the triggers are accurately synchronized with said first and second pulses.

10. Apparatus for achieving automatic phase coherence between a first signal and a second signal comprising a controllable source of third signals, means coupled to said source for generating pulses in response to said third signals, a gated oscillator responsive to said pulses and producing said first signal having a phase determined thereby, a source of second signals, a phase comparator, means for coupling said first and second signals to said phase comparator to produce a control signal indicative of the phase displacement between said first and second signals and means for coupling said control signal to said source of third signals to determine the frequency thereof.

No references cited.